Dec. 9, 1958     C. B. SPASE     2,863,544
TORQUE METERING CLUTCH

Filed April 18, 1957     3 Sheets-Sheet 2

INVENTOR.
CHARLES B. SPASE
BY D. Emmett Thompson
Attorney

United States Patent Office 2,863,544
Patented Dec. 9, 1958

2,863,544

TORQUE METERING CLUTCH

Charles B. Spase, Syracuse, N. Y., assignor to Lipe-Rollway Corporation, Syracuse, N. Y., a corporation of New York Application April 18, 1957, Serial No. 653,605

1 Claim. (Cl. 192—104)

This invention relates to and has as an object a new and improved torque metering clutch or unit of the type to be used in connection with automotive vehicles to limit the torque transmitted from the vehicle to accessories, such as the fan, water pump, air compressor, etc., which are used in such vehicles. The torque transmitted to such accessories must be limited when the engine of the vehicle is running at high speeds to prevent the improper operation or even failure of such accessories due to such high engine speeds.

Such clutches or units normally meter the torque transmitted to the accessories by allowing slippage to take place within the unit at and above the selected predetermined maximum operating speeds of the accessories. This slippage absorbs the excess torque delivered to the unit by generating heat, the excess torque being thus converted into heat horsepower by the unit. Since the unit operates under maximum and minimum loads having a different value, the speed differential between these variants must be kept as small as possible in order to minimize the heat horsepower loss because too much heat generated in the unit will impair the operating characteristics of the unit.

Accordingly, it is an object of this invention to provide a torque metering clutch of such a construction that the speed differential between maximum and minimum values of load demand on the clutch is kept as low as possible.

The invention consists in the novel features and in the combinations and constructions hereinafter set forth and claimed.

In describing this invention, reference is had to the accompanying drawings in which like characters designate corresponding parts in all the views.

In the drawings—

Figure 1:
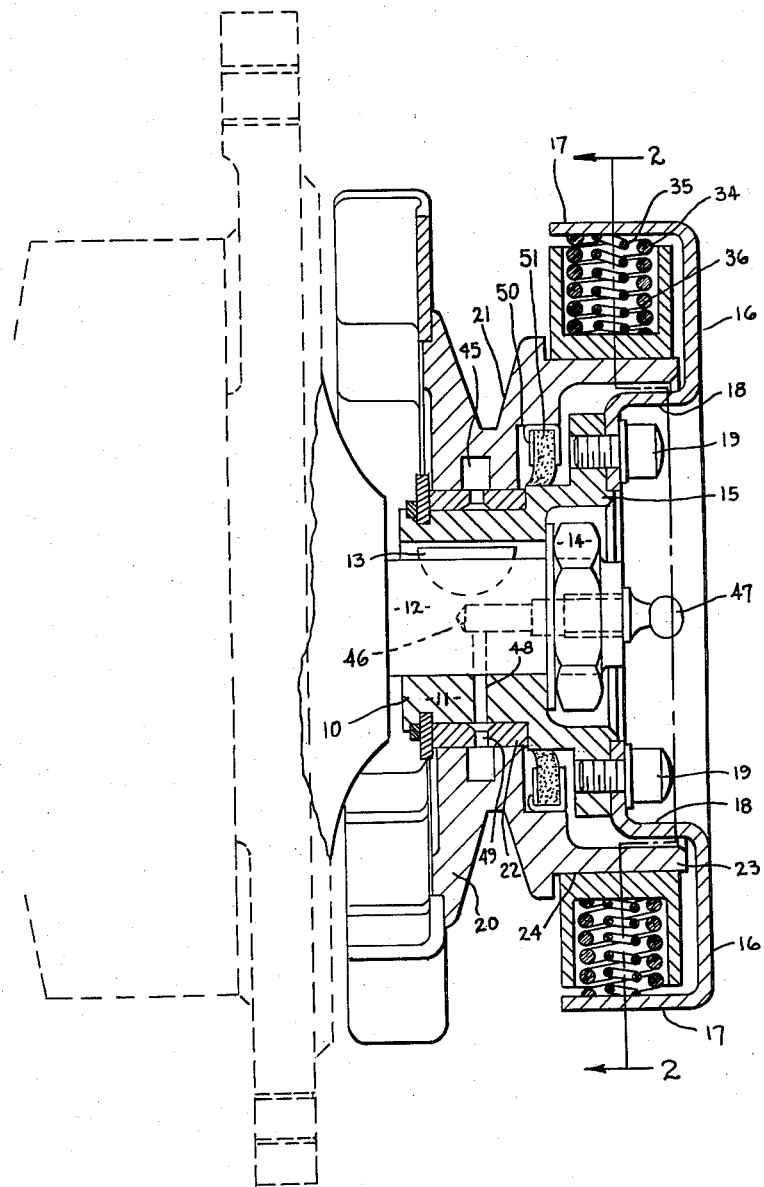
Figure 1 is a cross section of a side elevation of my invention.

Referring now to Figure 1, it will be seen that the clutch is made up of a driven member 10 which has a hub portion 11. The driven member is keyed to a generator shaft 12 by means of the key 13, and nut 14. The driven member 10 has an annular flange 15 to which an annular channel member having a bottom wall 16, an outer wall 17, and an inner wall 18 is affixed to the flange 15 as by fasteners 19.

A driving member 20, having a pulley sheave 21, is journalled about the driven member 10 on an antifriction bushing 22. The driving member 20 has an annular flange 23 extending forwardly into the channel member in proximity to the inner side wall 18 and flange 23 has an external friction drum surface 24, for a purpose hereinafter described.

Mounted in the space between the outer wall 17 of the channel member and the surface 24 are a plurality of friction shoes 30, 31. The friction shoes 30, 31 are held into engagement with the surface 24 by a pair of springs 34, 35, which are received in a recess 36 in each of the shoes 30, 31, and urge the shoes 30, 31, into engagement with the surface 24.

As will be seen from Figure 1, the pulley sheave 21 of the driving member 20 is formed with an annular groove 45. The shaft 12 is formed with an axially extending passage 46, the outer end of which is threaded to receive a lubricant fitting 47. The inner end of the passage 46 communicates with a radially extending passage 48 arranged in registry with a passage 49 formed in the bushing 22. With this arrangement, the groove 45 may be conveniently supplied with lubricant through the fitting 47. The pulley is recessed to receive an annular seal 51 to prevent the escape of lubricant between the flange 23 and the channel member.

Figure 2:
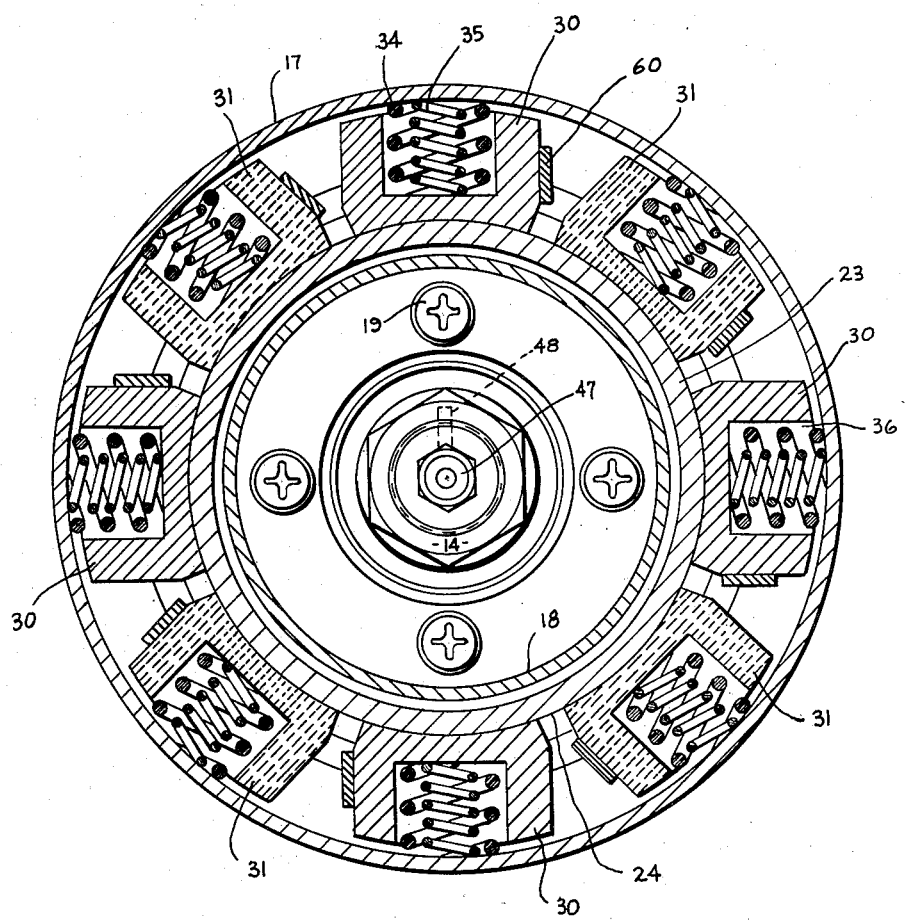
Figure 2 is a cross section taken on line 2—2 of Figure 1.

As will be apparent from Figure 2, the shoes 30 are formed of different material from the shoes 31, and are arranged alternately around the drum surface 24 between the shoes 31. The bottom wall 16 of the channel member is formed with circumferentially spaced apart tabs 60, these tabs being struck inwardly from the bottom wall forming apertures in said wall. The friction shoes 30, 31, are positioned intermediate the tabs 60 so that the driving torque is transmitted from the drum 24 to the friction shoes through the tabs 60.

In operation, the shoes 30, 31 and springs 34, 35 effect a frictional driving engagement between the driving member 20 and the driven member 10 through the tabs 60 on the channel member which is affixed to the driven member 10. Whenever the speed of the driving member 20 reaches a selected predetermined maximum, centrifugal force will cause the pressure exerted by springs 34 and 35 to be decreased, thus allowing slip to take place between the shoes 30, 31 and the drum surface 24, thereby limiting or metering the amount of torque transmitted from the driving member 20 to the driven member 10 at a predetermined speed. This slippage generates considerable heat in the unit when the vehicle engine is operating at high speeds. The heat thus generated must be kept as low as possible since the coefficient of friction of the shoes 30 and 31 will decrease as the shoes become hotter.

The shoes 30 being of a heavier weight than the shoes 31 it will be obvious that when the unit is rotated the centrifugal force of the shoes 30 will be greater at all speeds than that of the shoes 31. Consequently, the shoes 30 will fail to transmit any torque at a lower speed than the speed at which the shoes 31 will no longer transmit any torque, the torque transmitted by the unit being the cumulative amount transmitted by both sets of shoes 30 and 31 below the speed at which the shoes 30 no longer transmit torque while the torque transmitted by the unit above that speed is due solely to the shoes 31.

Since the crankshaft and consequently the driving member 20 may be rotating at speeds up to 5000 revolutions per minute while the maximum permissable speed of the driven member may be 3600 revolutions per minute it will be seen that the energy of 1400 revolutions per minute must be absorbed by the clutch through the slippage of the shoes 30, 31 thus transforming this energy into heat horsepower.

Figure 3:
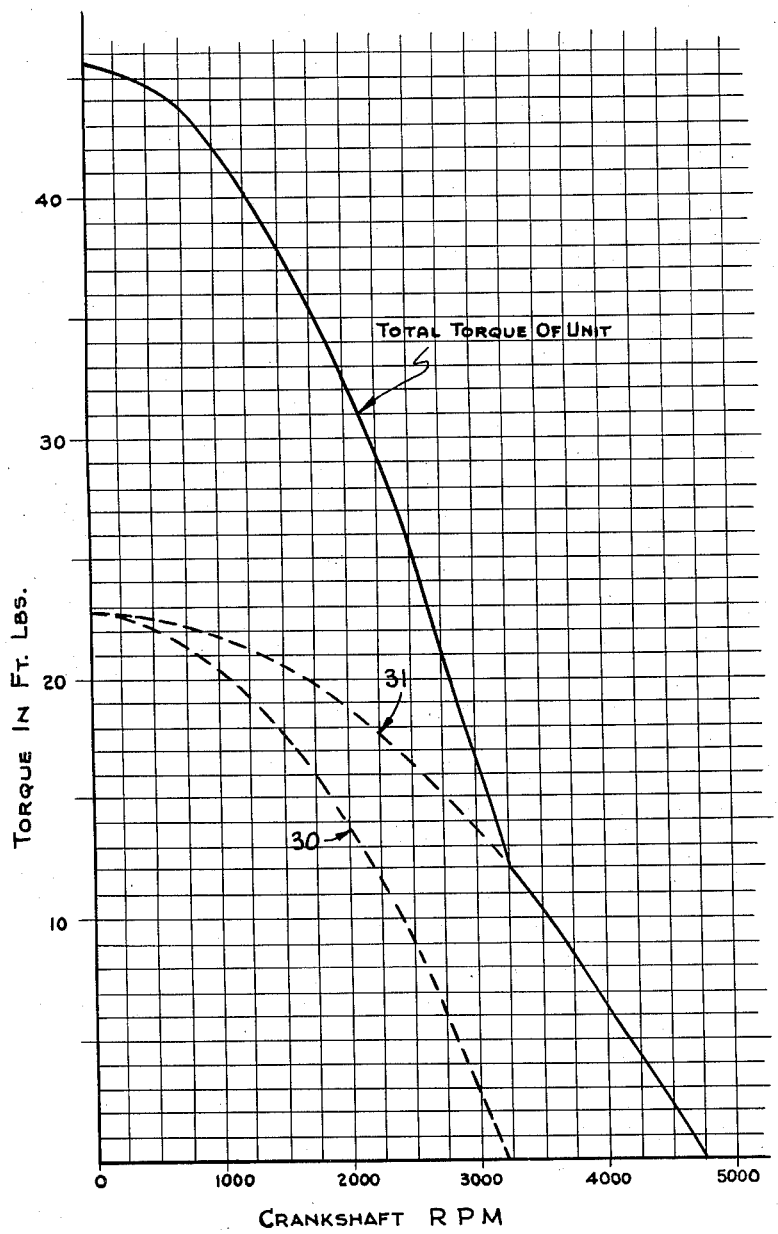
Figure 3 is a graph of torque capacity of my invention.

Referring now to the torque capacity graph for the clutch shown in Figure 3, it will be seen that the crankshaft speed has been plotted on the abscissa in increments of 1000 revolutions per minute. The torque is plotted on the ordinate in increments of ten foot pounds. The solid line indicates the total or cumulative torque transmitted by the unit while the dash lines indicate the component amount of torque transmitted by the shoes 30 and 31 respectively. As will be seen, the solid line more nearly approximates a vertical straight line above the point at which the shoes 30 no longer exert a frictional engagement with the drum surface 24. As stated previously, it is important that the speed differential between the maximum and minimum loads which the unit is required to transmit be kept as low as possible in order to minimize the amount of heat generated in the unit. In the graph of Figure 3, if the unit is required to transmit a maximum load of twenty foot pounds and a minimum load of fifteen foot pounds, it will be seen that the speed differential of the unit between these loads is of the order of 350 R. P. M. by using a combination of different weight shoes 30, 31 in the unit. However, as will be obvious, if shoes all having the same weight were used in the unit, this differential would be considerably greater. Consequently, it will be seen that by using shoes having different weights and arranging them alternately about the drum surface of the driving member 20, I have provided a clutch wherein the heat horsepower loss is kept to a minimum.

What I claim is:

A torque metering clutch comprising a driving member having a friction drum surface, a driven member having an annular flange in spaced outwardly concentric relation to said driving member drum surface, a first series of friction shoes in the space between said drum surface and said flange in which each shoe is of the same weight, springs urging the shoes of said first series into frictional engagement with said friction drum surface, means to transmit rotary motion of the shoes of said first series to said driven member, a second series of friction shoes in the space between said drum surface and said flange in which each of the shoes is of the same weight, the weight of the shoes of the second series being different from the weight of the shoes in the first series, the shoes of the second series being alternately interposed between the shoes of the first series, springs urging the shoes of said second series into frictional engagement with said friction drum surface, and means to transmit rotary motion of the shoes of the second series to said driven member, whereby to provide a torque metering clutch in which either one or two series of shoes are in frictional engagement and whereby the clutch is in dynamic balance during both conditions of engagement.

References Cited in the file of this patent

UNITED STATES PATENTS

| 1,819,829 | Wersall | Aug. 18, 1931 |
| 2,758,689 | Spase | Aug. 14, 1956 |

FOREIGN PATENTS

| 393,852 | Germany | July 18, 1924 |
| 1,116,829 | France | Feb. 13, 1956 |